(12) United States Patent
Mori (10) Patent No.: US 9,578,402 B2
(45) Date of Patent: Feb. 21, 2017

(54) WATERPROOF SOUND-TRANSMITTING MEMBRANE, SOUND-TRANSMITTING MEMBER, AND ELECTRICAL DEVICE

(71) Applicant: NITTO DENKO CORPORATION, Ibaraki-shi, Osaka (JP)

(72) Inventor: Masaaki Mori, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 14/766,542

(22) PCT Filed: Oct. 28, 2013

(86) PCT No.: PCT/JP2013/006350
§ 371 (c)(1),
(2) Date: Aug. 7, 2015

(87) PCT Pub. No.: WO2014/128799
PCT Pub. Date: Aug. 28, 2014

(65) Prior Publication Data
US 2015/0373439 A1    Dec. 24, 2015

(30) Foreign Application Priority Data

Feb. 25, 2013    (JP) .................................. 2013-035079

(51) Int. Cl.
*H04R 29/00*        (2006.01)
*B32B 3/26*         (2006.01)
(Continued)

(52) U.S. Cl.
CPC ................ *H04R 1/023* (2013.01); *B32B 3/26* (2013.01); *B32B 5/028* (2013.01); *B32B 5/30* (2013.01);
(Continued)

(58) Field of Classification Search
CPC ... H04R 1/023; H04R 29/001; H04R 2499/11; B32B 3/26; B32B 5/028; B32B 5/30; B32B 27/12; B32B 27/322; B32B 27/36; B32B 2250/02; B32B 2262/0284; B32B 2307/10; B32B 2307/402; B32B 2307/54; B32B 2307/724; B32B 2307/7246; B32B 2307/7265; B32B 2457/00
See application file for complete search history.

(56) References Cited

U.S. PATENT DOCUMENTS 5,828,012 A  * 10/1998  Repolle .................. H04R 1/023
                                                          181/175
2004/0127614 A1* 7/2004  Jiang ...................... C08F 10/00
                                                          524/270
(Continued)

FOREIGN PATENT DOCUMENTS

JP        10-165787        6/1998
JP        2003-503991      1/2003
(Continued)

*Primary Examiner* — Sonia Gay
(74) *Attorney, Agent, or Firm* — Hamre, Schumann, Mueller & Larson, P.C.

(57) ABSTRACT

A waterproof sound-transmitting membrane (1) of the present invention includes a porous membrane (11) containing polytetrafluoroethylene as a main component and a supporting member (12) that supports the porous membrane (11). The supporting member (12) is joined to the porous membrane (11) placed thereon and is not subjected to stretching after the porous membrane (11) is placed thereon. The supporting member (12) is a mesh or a net having a fiber diameter of 45 to 60 μm and an opening size of 700 to 1100 μm across the supporting member (12). The waterproof sound-transmitting membrane (1) has a water entry pressure of 20 kPa or more as measured according to the method B (high hydraulic pressure method) of JIS L 1092.

7 Claims, 4 Drawing Sheets

(51) Int. Cl.
  *B32B 5/02*   (2006.01)
  *B32B 5/30*   (2006.01)
  *B32B 27/36*  (2006.01)
  *B32B 27/32*  (2006.01)
  *B32B 27/12*  (2006.01)
  *H04M 1/03*   (2006.01)
  *H04R 1/02*   (2006.01)

(52) U.S. Cl.
  CPC ............. *B32B 27/12* (2013.01); *B32B 27/322* (2013.01); *B32B 27/36* (2013.01); *H04M 1/03* (2013.01); *B32B 2250/02* (2013.01); *B32B 2250/244* (2013.01); *B32B 2262/0284* (2013.01); *B32B 2307/10* (2013.01); *B32B 2307/402* (2013.01); *B32B 2307/54* (2013.01); *B32B 2307/724* (2013.01); *B32B 2307/7246* (2013.01); *B32B 2307/7265* (2013.01); *B32B 2457/00* (2013.01); *H04R 29/001* (2013.01); *H04R 2499/11* (2013.01); *Y10T 442/10* (2015.04)

(56) References Cited

U.S. PATENT DOCUMENTS

| 2009/0268928 | A1* | 10/2009 | Ikeyama | C09J 7/0282 |
| | | | | 381/150 |
| 2010/0247857 | A1* | 9/2010 | Sanami | H04M 1/18 |
| | | | | 428/138 |
| 2011/0188247 | A1 | 8/2011 | Huang et al. | |
| 2011/0255128 | A1* | 10/2011 | Ozawa | G06F 3/1203 |
| | | | | 358/1.15 |
| 2013/0308809 | A1* | 11/2013 | Thompson | H04R 1/2834 |
| | | | | 381/332 |

FOREIGN PATENT DOCUMENTS

| JP | 2003-053872 | 2/2003 |
| JP | 2003-250188 | 9/2003 |
| JP | 2004-083811 | 3/2004 |
| JP | 2009-111993 | 5/2009 |
| JP | 2012-025160 | 2/2012 |
| WO | 01/03468 | 1/2001 |
| WO | 2011/132062 | 10/2011 |

* cited by examiner

WATERPROOF SOUND-TRANSMITTING MEMBRANE, SOUND-TRANSMITTING MEMBER, AND ELECTRICAL DEVICE

TECHNICAL FIELD

The present invention relates to a waterproof sound-transmitting membrane, a sound-transmitting member including the waterproof sound-transmitting membrane, and an electrical device including the waterproof sound-transmitting membrane or sound-transmitting member.

BACKGROUND ART

In recent years, electrical devices, such as mobile phones, laptop computers, electronic notebooks, digital cameras, and game machines, generally have audio capabilities. A sound emitter such as a speaker or a buzzer, or a sound receiver such as a microphone, is disposed inside a housing of an electrical device with audio capabilities. An opening is provided in the housing of the electrical device at a position corresponding to the sound emitter or the sound receiver. Sounds are transmitted through the opening. In addition, these electrical devices are required to have waterproofness. To meet this requirement, it is known to use a waterproof sound-transmitting membrane to cover the opening of a housing of an electrical device with audio capabilities.

Patent Literature 1 and Patent Literature 2 propose the use of a plastic membrane, such as a porous polytetrafluoroethylene (hereinafter sometimes referred to as "PTFE") membrane, as a waterproof sound-transmitting membrane. Patent Literature 1 and Patent Literature 2 also propose a waterproof sound-transmitting membrane including a plastic membrane and further a support placed on the membrane to provide adequate strength and good workability to the waterproof sound-transmitting membrane. As examples of the support, nets of thermoplastic resins such as polyolefin and polyester are mentioned.

Patent Literature 3 discloses a porous PTFE membrane (waterproof sound-transmitting membrane) obtained by fusing a thermoplastic resin net to a longitudinally-stretched PTFE sheet and then stretching the PTFE sheet with the net attached thereto in the transverse direction. This production method is intended to improve the sound-transmitting characteristics and water resistance of the waterproof sound-transmitting membrane.

CITATION LIST

Patent Literature

Patent Literature 1: JP 2003-53872 A
Patent Literature 2: JP 2004-83811 A
Patent Literature 3: JP 10(1998)-165787 A

SUMMARY OF INVENTION

Technical Problem

However, there is a growing need for waterproof sound-transmitting membranes having higher water entry pressure characteristics. The above-mentioned waterproof sound-transmitting membranes have room for further improvement in their water entry pressure characteristics. On the other hand, it is also important that waterproof sound-transmitting membranes have good acoustic characteristics. So, it is an object of the present invention to provide a waterproof sound-transmitting membrane having good water entry pressure characteristics and good acoustic characteristics.

Solution to Problem

The present invention provides a waterproof sound-transmitting membrane including: a porous membrane containing polytetrafluoroethylene as a main component; and a supporting member that is joined to the porous membrane placed thereon and supports the porous membrane, the supporting member being not subjected to stretching after the porous membrane is placed thereon. The supporting member is a mesh or a net having a fiber diameter of 45 to 60 μm and an opening size of 700 to 1100 μm across the supporting member. The water entry pressure is 20 kPa or more as measured according to the method B (high hydraulic pressure method) of JIS L1092.

The present invention provides a sound-transmitting member including: above-described waterproof sound-transmitting membrane; and a membrane supporting member that supports the waterproof sound-transmitting membrane.

The present invention provides an electrical device including a sound emitter or a sound receiver. The above-described waterproof sound-transmitting membrane or the above-described sound-transmitting member is disposed over an opening provided in a housing of the electrical device at a position corresponding to the sound emitter or the sound receiver.

Advantageous Effects of Invention

According to the present invention, it is possible to provide a waterproof sound-transmitting membrane having good water entry pressure characteristics and good acoustic characteristics because, in the waterproof sound-transmitting membrane, a supporting member that is a mesh or a net having a predetermined fiber diameter and a predetermined opening size is joined to a porous membrane containing PTFE as a main component without being subjected to stretching. In addition, in an electrical device including a sound emitter or a sound receiver, the waterproof sound-transmitting membrane or a sound-transmitting member including the waterproof sound-transmitting membrane is disposed over the opening provided in a housing of the electrical device at a position corresponding to the sound emitter or the sound receiver, and therefore, the water entry pressure characteristics and the acoustic characteristics of the electrical device can be enhanced.

DESCRIPTION OF EMBODIMENTS

Hereinafter, embodiments of the present invention will be described with reference to the drawings. The following embodiments are merely illustrative of the present invention, and the present invention is not limited to these embodiments.

Figure 1:
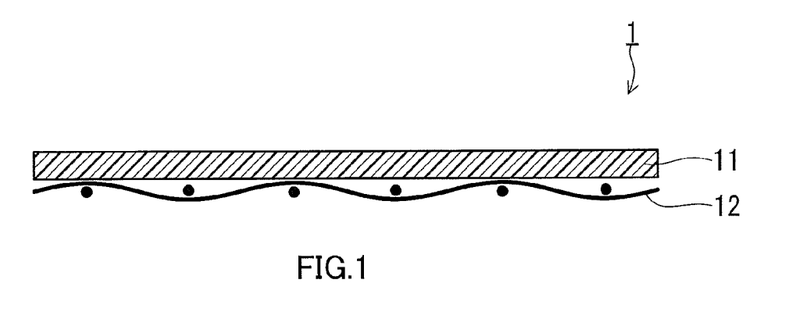
FIG. 1 is a cross-sectional view of an embodiment of a waterproof sound-transmitting membrane of the present invention.

As shown in FIG. 1, a waterproof sound-transmitting membrane 1 of the present embodiment includes a porous membrane 11 and a supporting member 12. The porous membrane 11 is a porous resin membrane containing PTFE as a main component. In the present description, the "main component" refers to a component whose content is the highest in terms of mass ratio. The supporting member 12 is joined to the porous membrane 11 placed thereon. The supporting member 12 supports the porous membrane 11. The supporting member 12 is a mesh or a net having a fiber diameter of 45 to 60 μm and an opening size of 700 to 1100 μm across the supporting member 12. Here, the opening size [μm] can be represented by (25400/M)–d, where M is the mesh (i.e., the number of fibers or openings per inch) of the supporting member 12 and d [μm] is the fiber diameter thereof. The supporting member 12 that is a mesh or a net is joined to the porous membrane 11 placed thereon, without being subjected to stretching after the porous membrane 11 is placed thereon. The mesh or net as the supporting member 12 has a grid structure, for example. The diameter of the longitudinal fibers of the supporting member 12 may be the same as or different from the diameter of the transverse fibers of the supporting member 12 as long as these diameters are in the above range. Furthermore, the longitudinal opening size of the supporting member 12 may be the same as or different from the transverse opening size of the supporting member 12 as long as these sizes are in the above range.

Since the porous membrane 11 has a porous structure, the waterproof sound-transmitting membrane 1 has the properties of preventing water droplets from passing through and allowing gases such as water vapor to pass through. In addition, the waterproof sound-transmitting membrane 1 allows sound to pass through. Therefore, in an electrical device provided with a sound emitter such as a speaker or a buzzer or a sound receiver such as a microphone, the waterproof sound-transmitting membrane 1 can be disposed over the opening provided in the housing of the electrical device at a position corresponding to the sound emitter or the sound receiver. Thereby, the waterproofness and the sound transmissibility of the electrical device can be ensured. Electrical devices with improved waterproofness are required so that they can be used under various environmental conditions. Therefore, waterproof sound-transmitting membranes with high water entry pressure characteristics are required.

The waterproof sound-transmitting membrane 1 of the present embodiment has high water entry pressure characteristics. Specifically, the water entry pressure of the waterproof sound-transmitting membrane 1 is 20 kPa or more, as measured according to the method B (high hydraulic pressure method) of JIS (Japanese Industrial Standards) L 1092. More specifically, a stainless steel mesh (opening size: 2 mm) is provided on a surface of the porous membrane 11 or the waterproof sound-transmitting membrane 1 opposite to a surface subjected to a pressure and then the water entry pressure of the porous membrane 11 or the waterproof sound-transmitting membrane 1 is measured according to the above standard. The water entry pressure of the waterproof sound-transmitting membrane 1 measured in this manner (hereinafter referred to as a "water entry pressure") is 20 kPa or more. The water entry pressure of the waterproof sound-transmitting membrane 1 is preferably 20 to 400 kPa, and more preferably 50 to 400 kPa.

The waterproof sound-transmitting membrane 1 has good acoustic characteristics. Specifically, the waterproof sound-transmitting membrane 1 has an insertion loss of 5 dB or less for sounds of 3000 Hz. Therefore, the waterproof sound-transmitting membrane 1 exhibits such good acoustic characteristics that the insertion loss is low for sounds in a relatively high frequency range. As a result, attenuation of sounds in a relatively high frequency range from a sound source is reduced when the sounds pass through the waterproof sound-transmitting membrane 1. Here, the insertion loss means a difference in sound pressure level between the case where the waterproof sound-transmitting membrane 1 is present in a sound transmission path and the case where the waterproof sound-transmitting membrane 1 is absent in the sound transmission path. The details of the method for measuring the acoustic characteristics of the waterproof sound-transmitting membrane 1 will be described later. The lower limit of the insertion loss for sounds of 3000 Hz of the waterproof sound-transmitting membrane 1 is not particularly limited.

For example, the porous membrane 11 can be produced in the following manner. First, a kneaded mixture of a PTFE fine powder and a forming aid is formed into a sheet by extrusion molding and rolling. The forming aid is removed from this sheet-shaped mixture to obtain a PTFE sheet. Then, the PTFE sheet is stretched in the longitudinal direction and in the width direction to obtain the porous membrane 11. The porous membrane 11 thus obtained has a porous structure in which innumerable spaces formed between fine fibers (fibrils) of PTFE serve as pores. The average pore diameter and porosity of the porous structure of the porous membrane 11 can be adjusted as appropriate by changing the stretching conditions for the PTFE sheet.

From the standpoint of ensuring both the waterproofness and the sound transmissibility of the waterproof sound-transmitting membrane 1, the average pore diameter of the porous membrane 11 is preferably 1 μm or less, more preferably 0.7 μm or less, and even more preferably 0.5 μm or less. The lower limit of the average pore diameter of the porous membrane 11 is not particularly limited, and is, for example, 0.1 μm. Here, the "average pore diameter" of the porous membrane 11 is the value measured according to the standards specified in ASTM (American Society for Testing and Materials) F316-86. The average pore diameter of the porous membrane 11 can be measured using, for example, commercially-available measurement equipment (e.g., Perm-Porometer manufactured by Porous Materials, Inc.) that meets the above standards.

From the standpoint of sound transmissibility, the surface density of the porous membrane 11 is preferably 2 to 10 g/m², more preferably 2 to 8 g/m², and even more preferably 2 to 5 g/m².

From the standpoint of sound transmissibility, it is preferable that the porous membrane 11 have a low surface density. However, it is difficult to attach a double-sided adhesive tape to such a porous PTFE membrane alone or to punch such a porous PTFE membrane alone due to its low mechanical strength. In addition, due to its low mechanical strength, such a porous PTFE membrane may shrink or tear under tensile stress (line tension). In particular, problems as described above may occur frequently in a porous PTFE membrane having a low surface density of, for example, 2 to 5 g/m². That is why it is difficult to perform the works as mentioned above on a porous PTFE membrane having a low surface density (5 g/m² or less). However, in the waterproof sound-transmitting membrane 1, the porous membrane 11 is supported by the supporting member 12. Therefore, even if the surface density of the porous membrane 11 is 5 g/m$^2$ or less, it is easy to perform the above-mentioned works on the waterproof sound-transmitting membrane 1. This means that the waterproof sound-transmitting membrane 1 has excellent handleability.

The porous membrane 11 may be subjected to coloring treatment. The main component of the porous membrane 11 is PTFE, and therefore, the intrinsic color of the porous resin membrane 11 is white. Therefore, if the waterproof sound-transmitting membrane 1 is provided in an electrical device in such a manner that the porous membrane 11 covers the opening of the housing of the electrical device, the presence of the porous membrane 11 stands out conspicuously. So, the porous membrane 11 is subjected to coloring treatment according to the color of the housing to make the presence of the porous membrane 11 less conspicuous when the waterproof sound-transmitting membrane 1 is disposed in the housing. For example, the porous membrane 11 is colored black.

The porous membrane 11 may be subjected to liquid-repellent treatment. In this case, the porous membrane 11 has good water repellency or good oil repellency. This porous membrane 11 is suitable for use in the waterproof sound-transmitting membrane 1. The liquid-repellent treatment can be performed, for example, by a known method after the porous membrane 11 is subjected to coloring treatment. A liquid-repellent agent used for the liquid-repellent treatment is not particularly limited, and is typically a material containing a polymer having perfluoroalkyl groups.

It is desirable that the supporting member 12 that is a mesh or a net be made of a resin material having a Young's modulus of 0.2 to 7.0 GPa from the standpoint of ensuring good handleability of the waterproof sound-transmitting membrane 1. Examples of the resin material include polyolefin, polyester, polyamide, fluorine resin, and ultra-high molecular weight polyethylene. The Young's modulus of the resin material forming the supporting member 12 is preferably 1.0 to 4.0 GPa, and more preferably 1.5 to 3.1 GPa. Here, the Young's modulus of the resin material is the value measured according to JIS K 7161 to 7164.

Preferably, a polyester as the resin material forming the supporting member 12 is polyethylene terephthalate. When the resin material forming the supporting member 12 is polyethylene terephthalate, it is easier to obtain a waterproof sound-transmitting membrane having good water entry pressure characteristics and good acoustic characteristics, that is, having a water entry pressure of 20 kPa or more and an insertion loss of 5 dB or less for sounds of 3000 Hz.

The waterproof sound-transmitting membrane 1 can be produced by lamination in which the porous membrane 11 is placed on the supporting member 12 to form a stack and a pressure is applied to the stack under predetermined temperature conditions and predetermined pressing conditions. Thus, the porous membrane 11 and the supporting member 12 are joined together. Since the porous membrane 11 is obtained by stretching a PTFE sheet as described above, there is no need to further stretch the porous membrane 11 after being placed on the supporting member 12. Therefore, the waterproof sound-transmitting membrane 1 is produced using the porous membrane 11 and the supporting member 12 that are joined together but are not subjected to stretching after being joined together. Thus, the supporting member 12 is joined to the porous membrane 11 placed thereon, without being subjected to stretching after the porous membrane 11 is placed thereon. Thereby, the water entry pressure characteristics of the waterproof sound-transmitting membrane 1 can be enhanced.

Figure 2:
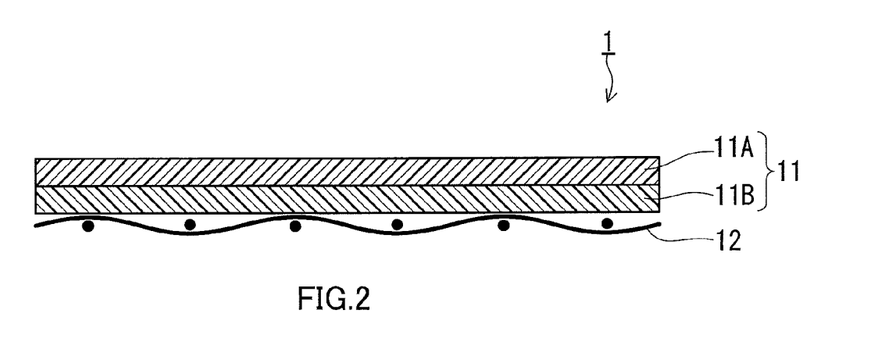
FIG. 2 is a cross-sectional view of another embodiment of a waterproof sound-transmitting membrane of the present invention.

As shown in FIG. 2, the waterproof sound-transmitting membrane 1 may be configured in such a manner that the porous membrane 11 has a multilayer structure of two or more porous membranes. Hereinafter, the embodiment in which the porous membrane 11 has a multilayer structure of two or more porous membranes is described. The waterproof sound-transmitting membrane 1 of this embodiment is configured in the same manner as in the above embodiment, unless otherwise specified.

The porous membrane 11 has a multilayer structure of a first porous membrane 11A and a second porous membrane 11B. The first porous membrane 11A and the second porous membrane 11B are each obtained by stretching a PTFE sheet in the longitudinal direction and in the width direction, as described above. Therefore, the first porous membrane 11A and the second porous membrane 11B each have a porous structure in which innumerable spaces formed between fine fibers (fibrils) of PTFE serve as pores. The first porous membrane 11A or the second porous membrane 11B may be colored any desired color or may not be colored.

It is desirable that the first porous membrane 11A forming one principal surface of the waterproof sound-transmitting membrane 1 be colored black, for example by the above-described coloring treatment. In this case, if the waterproof sound-transmitting membrane 1 is disposed at an opening provided in a housing of an electrical device in such a manner that the first porous membrane 11A is exposed to the outside of the housing, the presence of the waterproof sound-transmitting membrane 1 is less conspicuous. The waterproof sound-transmitting membrane 1 may have a multilayer structure of three or more porous membranes. In this case, it is desirable that a porous membrane forming one principal surface of the sound-transmitting membrane 1 be colored according to the color (e.g., black) of the housing. In addition, the first porous membrane 11A or the second porous membrane 11B may be subjected to liquid-repellent treatment as described above.

It is desirable that the average pore diameter of each of the first porous membrane 11A and the second porous membrane 11B be within the range described above for the average pore diameter of the porous membrane 11 of the waterproof sound-transmitting membrane 1A. The average pore diameter of the first porous membrane 11A may be the same as or different from the average pore diameter of the second porous membrane 11B. In addition, from the standpoint of ensuring the sound transmissibility, the surface density of the porous membrane 11 composed of two or more porous membranes (the first porous membrane 11A and the second porous membrane 11B) is preferably 2 to 10 g/cm$^2$, more preferably 2 to 8 g/cm$^2$, and even more preferably 2 to 5 g/cm$^2$.

Figure 3:
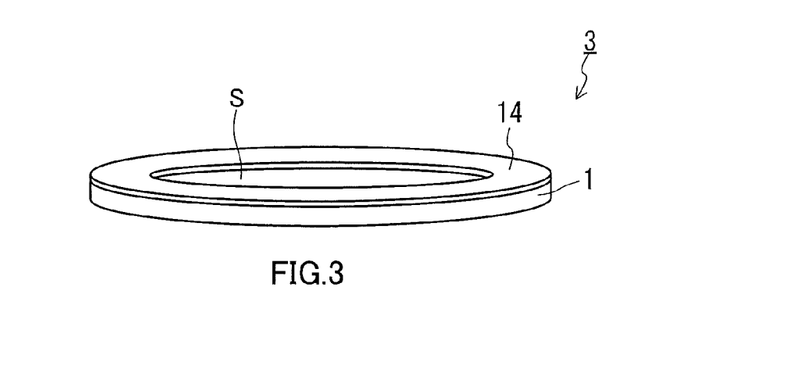
FIG. 3 is a perspective view of an example of an embodiment of a sound-transmitting member of the present invention.

Next, a sound-transmitting member 3 is described. As shown in FIG. 3, the sound-transmitting member 3 is formed by attaching a ring-shaped membrane supporting member 14 to the peripheral portion of the disk-shaped waterproof sound-transmitting membrane 1. The membrane supporting member 14 supports the waterproof sound-transmitting membrane 1. In other words, the sound transmitting member 3 includes the waterproof sound-transmitting membrane 1 and the membrane supporting member 14 that supports the waterproof sound-transmitting membrane 1. With this structure, the waterproof sound-transmitting membrane 1 can be reinforced, and the sound-transmitting member 3 is easy to handle. In addition, since the membrane supporting member 14 serves as a portion to be attached to a housing of an electrical device, the efficiency of attaching the waterproof sound-transmitting membrane 1 to the housing is improved. The shape of the membrane supporting member 14 is not particularly limited as long as it can support the waterproof sound-transmitting membrane 1. The material of the membrane supporting member 14 is not particularly limited, and a resin, a metal, or a composite material thereof can be used. The method for attaching the membrane supporting member 14 to the sound-transmitting membrane 1 is not particularly limited. Examples of the method that can be employed include heat welding, ultrasonic welding, bonding using an adhesive agent, and bonding using a double-sided adhesive tape.

Furthermore, as shown in FIG. 3, the waterproof sound-transmitting membrane 1 has a sound-transmitting surface S. The sound-transmitting surface S is a region of the waterproof sound-transmitting membrane 1 that is not joined to any other member, a housing of an electrical device, or the like and thus exposed. If the waterproof sound-transmitting membrane 1 is disposed in an electrical device to cover the opening of the housing of the electrical device, most of the incoming and outgoing sounds pass through the sound-transmitting surface S of the waterproof sound-transmitting membrane 1 when they enter or leave the housing of the electrical device. From the standpoint of reducing the size of the electrical device, it is desirable that the waterproof sound-transmitting membrane 1 have a smaller sound-transmitting surface S. The maximum diameter of the sound-transmitting surface S of the waterproof sound-transmitting membrane 1 is, for example, 0.5 to 4.0 µm, preferably 0.75 to 2.5 mm, and more preferably 1.0 to 2.0 mm. Thus, the size of the sound-transmitting surface S of the waterproof sound-transmitting membrane 1 is relatively small. The above-described features of the supporting member 12 of the waterproof sound-transmitting membrane 1 of the present embodiment are particularly preferred features for the waterproof sound-transmitting membrane 1 having a relatively small sound-transmitting surface S to exhibit good water entry pressure characteristics (a water entry pressure of 20 kPa or more) and good acoustic characteristics (an insertion loss of 5 dB or less for sounds of 3000 Hz). The maximum diameter of the sound-transmitting surface S refers to the longest distance between two arbitrary points on the outer periphery of the sound-transmitting surface S.

Figure 4A:
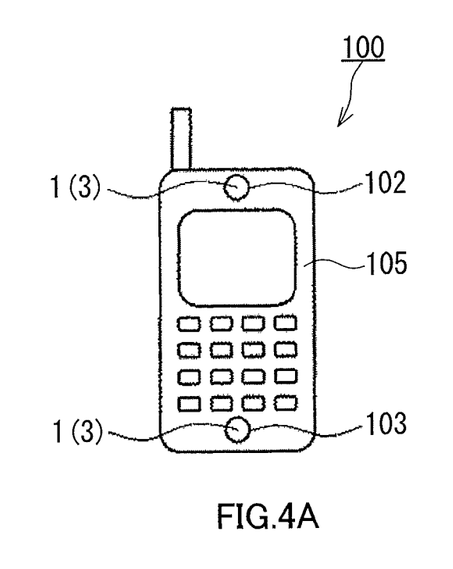
FIG. 4A is a front view of an example of a mobile phone as an example of an electrical device of the present invention.
Figure 4B:
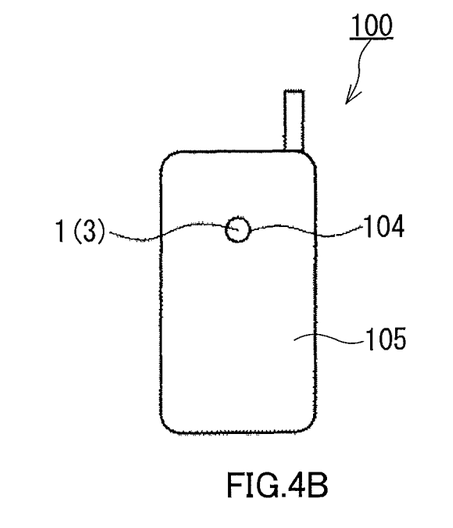
FIG. 4B is a rear view of an example of a mobile phone as an example of an electrical device of the present invention.

Next, an electrical device having the waterproof sound-transmitting membrane or the sound-transmitting member of the present invention is described. An electrical device 100 is, for example, a mobile phone as shown in FIG. 4A and FIG. 4B. A mobile phone 100 includes a housing 105 and a speaker, a microphone, and a buzzer (not shown) provided in the housing 105. That is, the electrical device 100 includes the speaker and the buzzer as sound emitters and the microphone as a sound receiver. The housing 105 has an opening 102 corresponding to the speaker, an opening 103 corresponding to the microphone, and an opening 104 corresponding to the buzzer. The waterproof sound-transmitting membrane 1 or the sound-transmitting member 3 described above is disposed over the openings 102, 103, and 104. Therefore, the electrical device 100 has good water entry pressure characteristics and good acoustic characteristics.

EXAMPLES

The present invention will be described in detail with reference to Examples. The following Examples are merely illustrative of the present invention, and the present invention is not limited to the following Examples. First, the method for evaluating porous membranes or sound-transmitting membranes according to Examples and Comparative Examples will be described.

<Air Permeability>

The air permeability of each porous membrane or waterproof sound-transmitting membrane was evaluated according to the method B (Gurley method) as the air permeability measurement method specified in JIS (Japanese Industrial Standards) L 1096.

<Water Entry Pressure>

The water entry pressure of each porous membrane or waterproof sound-transmitting membrane was measured using a water penetration testing device based on the method B (high hydraulic pressure method) specified in JIS L 1092:2009. However, when a test sample of the porous membrane having an area specified in this standard is used, the membrane is significantly deformed. Therefore, a stainless steel mesh (opening size: 2 mm) was provided on a surface of the porous membrane or the waterproof sound-transmitting membrane opposite to a surface subjected to a pressure so as to reduce the deformation of the porous resin membrane to some extent, and then the water entry pressure of the porous membrane or the waterproof sound-transmitting membrane was measured.

<Liquid Repellency>

Each porous membrane or waterproof sound-transmitting membrane was placed on a sheet of copy paper (regular paper). One drop of lamp oil was applied to the porous membrane on the sheet of copy paper using a dropper, and then the membrane and the sheet were left for 1 minute. Thereafter, the porous membrane was removed, and the condition of the sheet of copy paper was checked. In the case where the sheet of copy paper was wet with the oil lamp, it was determined that the porous membrane had no liquid repellency, while in the case where the sheet of copy paper was not wet, it was determined that the porous membrane had liquid repellency.

<Acoustic Characteristics>

Figure 5:
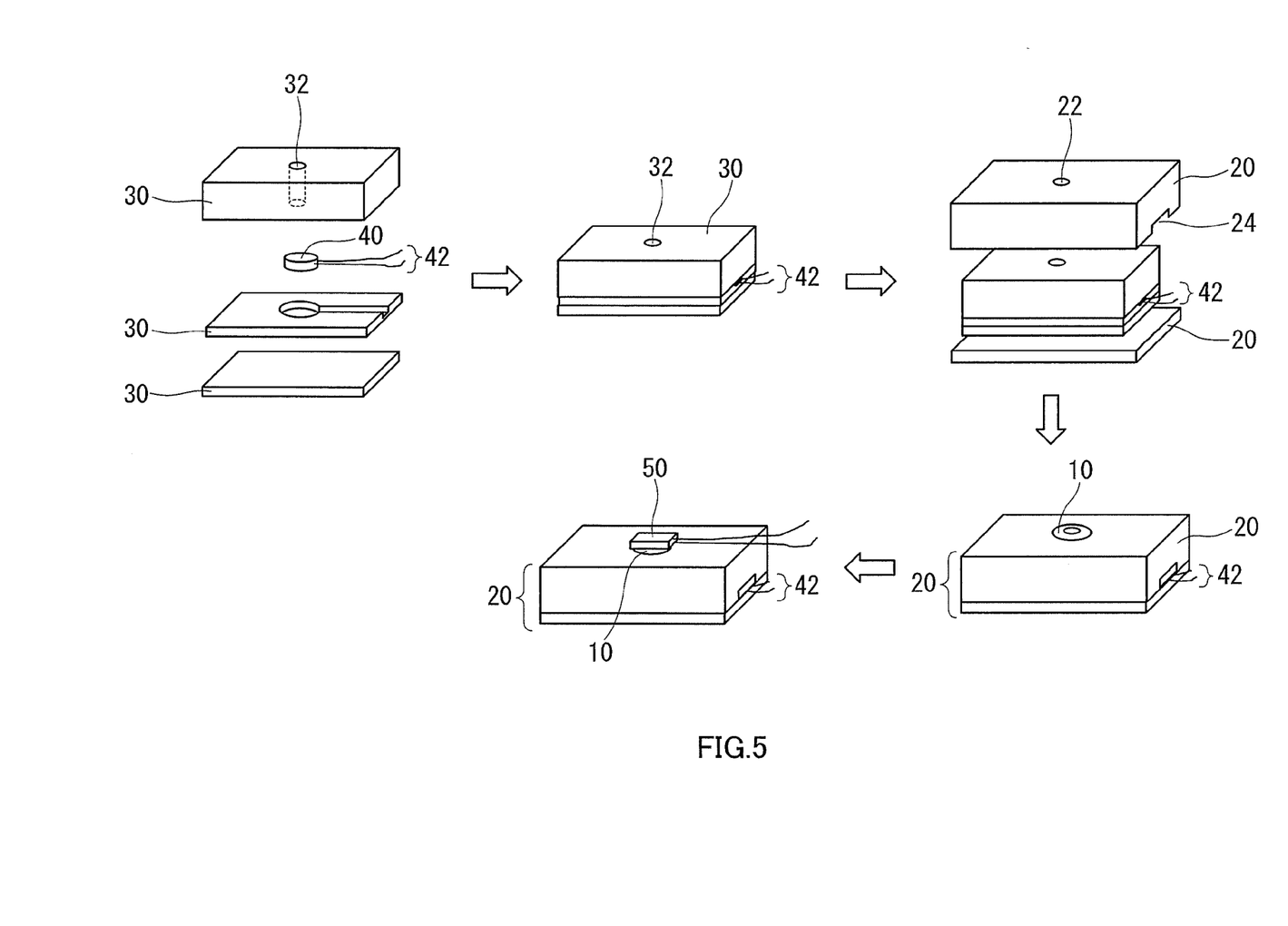
FIG. 5 is a flow chart showing the steps of measuring the acoustic characteristics of the waterproof sound-transmitting membrane.

For the obtained waterproof sound-transmitting membranes, the acoustic characteristics were evaluated as follows. First, as shown in FIG. 5, a simulated housing 20 made of polystyrene (outer dimensions of 60 mm×50 mm×28 mm) intended to be used as a housing of a mobile phone was prepared. This simulated housing 20 was provided with a speaker mounting hole 22 with a diameter of 2 mm and a guide hole 24 for a speaker cable 42. No opening other than the speaker mounting hole 22 and the guide hole 24 was provided in this simulated housing 20. Next, as shown in FIG. 5, a speaker 40 (SCG-16A manufactured by Star Micronics Co., Ltd.) was mounted in an urethane foam filling material 30 having a sound-transmitting hole 32 with a diameter of 5 mm, and then the filling material 30 with the speaker 40 mounted therein was enclosed in the simulated housing 20. The speaker cable 42 was guided to the outside of the simulated housing 20 through the guide hole 24. Then, the guide hole 24 was sealed with putty.

Figure 6:
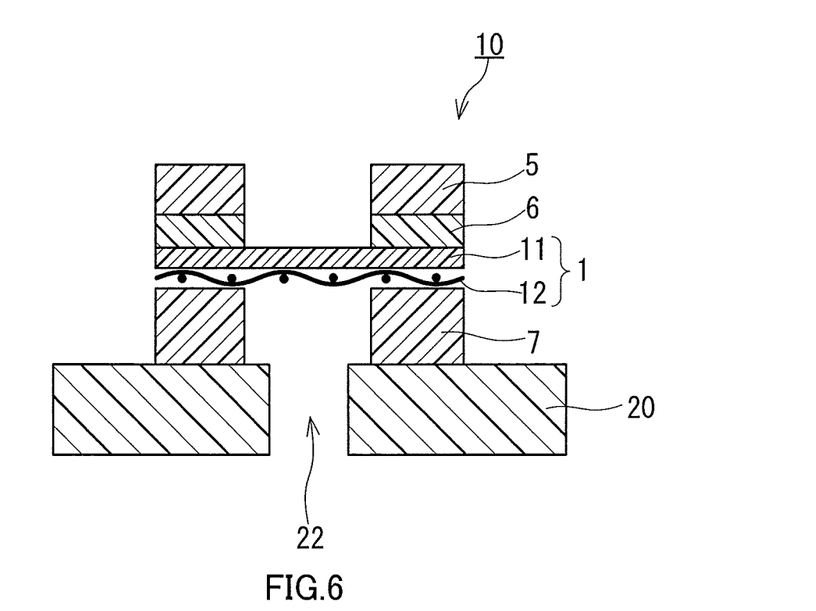
FIG. 6 is a cross-sectional view illustrating the placement of the waterproof sound-transmitting membrane in measurement of the acoustic characteristics thereof.

Next, as shown in FIG. 6, the waterproof sound-transmitting membrane 1 of each of Examples and Comparative Examples, a PET film 5 with a thickness of 0.1 mm, a double-sided adhesive tape 6 as a PET supporting member (No. 5603 manufactured by Nitto Denko Corporation, with a thickness of 0.03 mm), and a double-sided adhesive tape 7 as a polyethylene foam supporting member (No. 57120B manufactured by Nitto Denko Corporation, with a thickness of 0.20 mm) were used to prepare an evaluation sample 10 which was stamped to have an inner diameter of 2.5 mm and an outer diameter of 5.8 mm. Using these pieces, an evaluation sample 10 was prepared. Then, the evaluation sample 10 was attached over the speaker mounting hole 22 of the simulated housing 20 from outside. The waterproof sound-transmitting membrane 1 was attached to the simulated housing 20 so as to completely cover the speaker mounting hole 22 without any gap between the double-sided adhesive tape 7 and the simulated housing 20 and between the waterproof sound-transmitting membrane 1 and the double-sided adhesive tape 7.

Next, a microphone 50 (SPM0405HD4H-W8 manufactured by Knowles Acoustics) was placed above the waterproof sound-transmitting membrane 1 so as to cover the waterproof sound-transmitting membrane 1, and the microphone 50 was connected to an acoustic evaluation apparatus (Multi-analyzer System 3560-B-030 manufactured by B&K Corporation). The distance between the speaker 40 and the microphone 50 was 21 mm. Next, SSR analysis (test signal: 20 Hz to 10 kHz, sweep) was selected as an evaluation method and performed, and the acoustic characteristics (insertion loss) of the waterproof sound-transmitting membrane 1 were evaluated. When a sound pressure level was measured in a blank state where a through hole with a diameter of 2.5 mm was formed by breaking the center of the waterproof sound-transmitting membrane 1 to remove the portion within the inner periphery of the waterproof sound-transmitting membrane, the blank sound pressure level was −21 dB at 1000 Hz. The insertion loss was obtained from a test signal inputted from the acoustic evaluation apparatus to the speaker 40 and a signal received by the microphone 50. The insertion loss was obtained by subtracting, from the sound pressure level in the above-mentioned blank state, the sound pressure level measured in the presence of the waterproof sound-transmitting membrane 1 attached. The smaller value of the insertion loss indicates that the level of the sound outputted from the speaker 40 was maintained better.

Example 1

100 parts by weight of PTFE fine powder (F-104 manufactured by Daikin Industries, Ltd.) and 20 parts by weight of hydrocarbon oil ("Isoper M" manufactured by Esso Oil Co.) were uniformly mixed with each other. The obtained mixture was compressed by a cylinder, and then was formed into a sheet-shaped mixture by ram extrusion. Next, the sheet-shaped mixture obtained was passed between a pair of metal rolls and thus rolled to a thickness of 0.16 mm. Furthermore, the mixture was dried by heating at 150° C. to remove the forming aid. A sheet-shaped body of PTFE was thus obtained.

Next, the sheet-shaped body of PTFE obtained was stretched in the longitudinal direction (the rolling direction) at a stretching temperature of 260° C. and a stretching ratio of 10, and thus a porous PTFE membrane was obtained. The porous PTFE membrane was immersed, for several seconds, in a dye solution obtained by mixing 20 parts by weight of a black dye (25 weight % ethanol-diluted solution of SP BLACK 91-L manufactured by Orient Chemical Industries Co., Ltd.,) and 80 parts by weight of ethanol (purity of 95%) as a solvent for the dye. Thereafter, the porous PTFE membrane immersed in the dye solution was heated under the condition of 100° C. and thereby dried to remove the solvent. Thus, a porous PTFE membrane dyed black was obtained.

Next, the porous PTFE membrane prepared as described above was immersed in a liquid-repellent treatment solution for several seconds. Thereafter, the porous PTFE membrane was heated under the condition of 100° C. and dried to remove the solvent. A porous PTFE membrane having been subjected to liquid-repellent treatment was thus obtained. The oil-repellent treatment solution was prepared as follows. 100 g of a compound having a linear fluoroalkyl group and represented by the following (Formula 1), 0.1 g of azobisisobutyronitrile serving as a polymerization initiator, and 300 g of a solvent (FS thinner manufactured by Shin-Etsu Chemical Co., Ltd.) were put into a flask fitted with a nitrogen introducing pipe, a thermometer, and a stirrer. A nitrogen gas was introduced into the flask to allow addition polymerization to proceed under stirring at 70° C. for 16 hours. As a result, 80 g of a fluorine-containing polymer was obtained. This fluorine-containing polymer had a number average molecular weight of about 100000. The liquid-repellent treatment solution was prepared by diluting the fluorine-containing polymer with a diluent ("FS thinner" manufactured by Shin-Etsu Chemical Co., Ltd.) to a concentration of 3.0% by mass.

$$CH_2=CHCOOCH_2CH_2C_6F_{13} \quad \text{(Formula 1)}$$

Next, the porous PTFE membrane having been subjected to liquid-repellent treatment was stretched in the width direction (direction perpendicular to the longitudinal direction) at a stretching temperature of 150° C. and a stretching ratio of 10. Furthermore, the entire porous PTFE membrane was sintered at 360° C. which is higher than the melting point (327° C.) of PTFE to obtain a porous membrane (porous PTFE membrane) according to Example 1. The obtained porous membrane had an average pore diameter of 0.5 µm, a surface density of 5 g/m$^2$, an air permeability of 1.0 sec/100 mL, and a water entry pressure of 80 kPa.

Next, the obtained porous membrane and a polyethylene terephthalate (PET) mesh ("Hana 30-30" manufactured by Nippon Tokushu Fabric Inc.) serving as the supporting member for the porous membrane were joined together by heat lamination using hot pressing but the PET mesh was not subjected to stretching after being joined to the porous membrane. A waterproof sound-transmitting membrane according to Example 1 was thus obtained. The porous membrane and the PET mesh were joined together by applying a pressure of 0.5 MPa for 2 seconds at a heating temperature of 200° C. The waterproof sound-transmitting membrane thus obtained had a surface density of 13.5 g/cm$^2$, an air permeability of 1.0 sec/100 mL, a water entry pressure of 80 kPa, and "liquid repellency".

Example 2

A waterproof sound-transmitting membrane according to Example 2 was obtained in the same manner as in Example 1 except that a PET mesh having a fiber diameter of 55 µm and an opening size of 1000 µm ("Hana 24-30" manufactured by Nippon Tokushu Fabric Inc.) was used as a supporting member.

Comparative Example 1

A waterproof sound-transmitting membrane according to Comparative Example 1 was obtained in the same manner as in Example 1 except that a polyester mesh having a fiber diameter of 48 µm and an opening size of 206 µm ("LX 100SS" manufactured by Nippon Tokushu Fabric Inc.) was used as a supporting member.

Comparative Example 2

A waterproof sound-transmitting membrane according to Comparative Example 2 was obtained in the same manner as in Example 1 except that a polypropylene (PP) mesh having a fiber diameter of 85 µm and an opening size of 300 µm×800 µm ("Delnet RB0707-30P" manufactured by Delstar Technologies, Inc.) was used as a supporting member.

In Example 2 and Comparative Examples 1 and 2, the porous membrane and the supporting member were joined together at a heating temperature suitable for the material of each supporting member and under the same conditions of the heating time and the applied pressure as in Example 1.

Comparative Example 3

25 parts by weight of hydrocarbon oil ("Isoper M" manufactured by Esso Oil Co.) was uniformly mixed in 100 parts by weight of PTFE fine powder (Polyflon F-104U manufactured by Daikin Industries, Ltd.) to obtain a mixture. The mixture was preformed into a rod by paste extrusion. This preformed body was passed between a pair of metal rolls to obtain an unsintered tape with a thickness of 0.2 mm and a width of 370 mm. Next, this unsintered tape was stretched in the longitudinal direction at a temperature (375° C.) equal to or higher than the melting point of PTFE and a stretching ratio of 20 using a roll stretching machine. Thus, a longitudinally stretched sintered PTFE sheet was obtained. Next, a PP net, as a supporting member, having a grid structure with an opening size (mesh size) of 300 μm×800 μm and a fiber diameter of 85 μm was laminated on one principal surface of the longitudinally stretched sintered PTFE sheet at a temperature (180° C.) equal to or higher than the melting point of the net and a pressure of 5 kg/cm$^2$. Next, the laminated PTFE sheet was subjected to coloring treatment by a kiss coater, using a treatment agent obtained by mixing 100 parts by weight of water repellent agent (trade name: Scotchgard FX3576) and 190 parts by weight of a black dye (trade name: Valifast Black). After the coloring treatment, this PTFE sheet was stretched in the transverse direction at a temperature of 130° C. and a stretching ratio of 3 using a tenter. Thus, the waterproof sound-transmitting membrane according to Comparative Example 3 was obtained. In the waterproof sound-transmitting membrane according to Comparative Example 3, the PP net as a supporting member was placed on the PTFE sheet as a porous membrane and then stretched in the transverse direction at a stretching ratio of 3. The transverse opening size of the PP net was changed from 300 μm to 900 μm by this transverse stretching. The diameter of the fibers extending in the transverse direction of the PP net was changed from 85 μm to 49 μm. On the other hand, the diameter of the fibers extending in the longitudinal direction of the PP net remained unchanged at 85 μm.

Comparative Example 4

A waterproof sound-transmitting membrane according to Comparative Example 4 was obtained in the same manner as the method described in Example 1 of JP 10(1998)-165787 A. Specifically, the waterproof sound-transmitting membrane according to Comparative Example 4 was obtained in the following manner. First, 25 parts by weight of hydrocarbon oil ("Isoper M" manufactured by Esso Oil Co.) was uniformly mixed in 100 parts by weight of PTFE fine powder (Polyflon F-104U manufactured by Daikin Industries, Ltd.) to obtain a mixture. The mixture was preformed into a rod by paste extrusion. This preformed body was passed between a pair of metal rolls to obtain an unsintered tape with a thickness of 0.2 mm and a width of 370 mm. Next, this formed body was stretched in the longitudinal direction at a temperature (375° C.) equal to or higher than the melting point of PTFE and a stretching ratio of 50 using a roll stretching machine.

Thus, a longitudinally stretched sintered PTFE sheet was obtained. On the other hand, the PP net having a grid structure with an opening size (mesh size) of 1000 μm and a fiber diameter of 85 μm was stretched in the longitudinal direction at a temperature (130° C.) equal to or lower than the melting point of the net and a stretching ratio of 5. The longitudinal opening size of the PP net was changed from 1000 μm to 5000 μm by this stretching. The diameter of the fibers extending in the longitudinal direction of the PP net was changed from 85 μm to 38 μm.

Next, the resulting PP net was laminated on one principal surface of the longitudinally stretched sintered PTFE sheet at a temperature (180° C.) equal to or higher than the melting point of the net and a pressure of 5 kg/cm$^2$. Next, the laminated PTFE sheet was subjected to coloring treatment by a kiss coater, using a treatment agent obtained by mixing 100 parts by weight of a water repellent agent (trade name: Scotchgard FX3576) and 190 parts by weight of a black dye (trade name: Valifast Black). After the coloring treatment, this PTFE sheet was stretched in the transverse direction at a temperature of 130° C. and a stretching ratio of 6 using a tenter. Thus, the waterproof sound-transmitting membrane according to Comparative Example 4 was obtained. The transverse opening size of the PP net was changed from 1000 μm to 6000 μm by this stretching. The diameter of the fibers extending in the transverse direction of the PP net was changed from 85 μm to 35 μm.

Table 1 shows the characteristics of the supporting members, the water entry pressure characteristics, and the acoustic characteristics of the waterproof sound-transmitting membranes according to Examples and Comparative Examples. As shown in Table 1, in the waterproof sound-transmitting membranes of Example 1 and Example 2, the insertion losses for sounds of 3000 Hz were both 5 dB or less. By contrast, in the waterproof sound-transmitting membranes of Comparative Example 1 and Comparative Example 2, the insertion losses for sounds of 3000 Hz were more than 5 dB. These results revealed that the waterproof sound-transmitting membranes of Example 1 and Example 2 had good acoustic characteristics.

In addition, the water entry pressures of the waterproof sound-transmitting membranes of Example 1 and Example 2 were both 80 kPa. By contrast, the water entry pressure of the waterproof sound-transmitting membrane of Comparative Example 3 was 18 kPa, and the water entry pressure of the waterproof sound-transmitting membrane of Comparative Example 4 was 6 kPa. These results revealed that the waterproof sound-transmitting membranes of Example 1 and Example 2 had good water entry pressure characteristics. The insertion loss for sounds of 1000 Hz and the insertion loss for sounds of 3000 Hz in the waterproof sound-transmitting membrane of Comparative Example 3 were higher than those in the waterproof sound-transmitting membranes of Example 1 and Example 2. These results revealed that the waterproof sound-transmitting membranes of Example 1 and Example 2 had better acoustic characteristics than the waterproof sound-transmitting membrane of Comparative Example 3. The waterproof sound-transmitting membrane of Comparative Example 4 had good acoustic characteristics. However, if the maximum diameter of the sound-transmitting surface of the waterproof sound-transmitting membrane of Comparative Example 4 is, for example, 2.5 mm, it is difficult to produce a waterproof sound-transmitting membrane in which a fiber (thread) of the PP net is always present in the sound-transmitting surface of the waterproof sound-transmitting membrane. This makes it difficult to put the waterproof sound-transmitting membrane of Comparative Example 4 into mass production.

TABLE 1

| | Supporting member | | | | Water | Insertion loss [dB] | |
|---|---|---|---|---|---|---|---|
| | Fiber diameter [μm] | Fiber diameter after stretching [μm] | Opening size [μm] | Young's modulus [GPa] | entry pressure [kPa] | 1000 Hz | 3000 Hz |
| Example 1 | 55 | — | 800 | 2.0 to 3.1 | 80 | 2.0 | 4.5 |
| Example 2 | 55 | — | 1000 | 2.0 to 3.1 | 80 | 1.9 | 3.5 |
| Com. Example 1 | 48 | — | 206 | 2.0 to 3.1 | 100 | 1.7 | 5.7 |
| Com. Example 2 | 85 | — | 300 × 800 | 1.5 to 2.0 | 80 | 1.5 | 6.3 |
| Com. Example 3 | 85 | 85 (longitudinal direction) 49 (transverse direction) | 300 × 800 (before stretching) 900 × 800 (after stretching) | 1.5 to 2.0 | 18 | 3.2 | 5.7 |
| Com. Example 4 | 85 | 38 (longitudinal direction) 35 (transverse direction) | 1000 (before stretching) 6000 × 5000 (after stretching) | 1.5 to 2.0 | 6 | 0.5 | 0.9 |

The invention claimed is:

1. A waterproof sound-transmitting membrane comprising:
   a porous membrane containing polytetrafluoroethylene as a main component; and
   a supporting member that is joined to the porous membrane placed thereon and supports the porous membrane, the supporting member being not subjected to stretching after the porous membrane is placed thereon,
   wherein the supporting member is a mesh or a net having a fiber diameter of 45 to 60 μm and an opening size of 700 to 1100 μm across the supporting member, and
   a water entry pressure of the waterproof sound-transmitting membrane is 20 kPa or more as measured according to the method B (high hydraulic pressure method) of JIS L1092.

2. The waterproof sound-transmitting membrane according to claim 1, wherein an insertion loss for sounds of 3000 Hz is 5 dB or less.

3. The waterproof sound-transmitting membrane according to claim 1, wherein the supporting member is formed of a resin material having a Young's modulus of 0.2 to 7.0 GPa.

4. The waterproof sound-transmitting membrane according to claim 1, wherein the porous membrane has a surface density of 2.0 to 10.0 g/m$^2$.

5. A sound-transmitting member comprising:
   the waterproof sound-transmitting membrane according to claim 1; and
   a membrane supporting member that supports the waterproof sound-transmitting membrane.

6. An electrical device comprising a sound emitter or a sound receiver, wherein
   the waterproof sound-transmitting membrane according to claim 1 is disposed over an opening provided in a housing of the electrical device at a position corresponding to the sound emitter or the sound receiver.

7. An electrical device comprising a sound emitter or a sound receiver, wherein
   the sound-transmitting member according to claim 5 is disposed over an opening provided in a housing of the electrical device at a position corresponding to the sound emitter or the sound receiver.

* * * * *